United States Patent [19]

Sarai et al.

[11] 4,370,005
[45] Jan. 25, 1983

[54] DEVICE FOR PREVENTING TUBULAR BUSHING ASSEMBLY FROM SLIPPING OUT

[75] Inventors: Hiroshi Sarai; Eiichi Hamada; Norihiro Ueda, all of Toyota, Japan

[73] Assignee: Toyota Jidosha Kogyo Kabushiki Kaisha, Japan

[21] Appl. No.: 200,023

[22] Filed: Oct. 23, 1980

[30] Foreign Application Priority Data

Jul. 23, 1980 [JP] Japan .................. 55-103152[U]

[51] Int. Cl.³ .................................. F16C 11/04
[52] U.S. Cl. ............................ 384/154; 384/202
[58] Field of Search ............ 308/26, 237 R, 184 R, 308/22, 28, 15, 21

[56] References Cited

U.S. PATENT DOCUMENTS

| | | | |
|---|---|---|---|
| 3,133,769 | 5/1964 | Drake | 308/26 |
| 4,063,787 | 12/1977 | Bakken et al. | 308/184 R |
| 4,142,833 | 3/1979 | Rybicki et al. | 308/26 |

Primary Examiner—Lenard A. Footland
Attorney, Agent, or Firm—Kane, Dalsimer, Kane, Sullivan and Kurucz

[57] ABSTRACT

A device for preventing a tubular bushing assembly from slipping out of a hole in a bushing receiving portion, wherein the tubular bushing assembly is incorporated in a pivot coupling portion between two members, and includes an inner sleeve, a resilient member and an outer sleeve, the tubular bushing assembly being fitted under pressure into a hole provided in the bushing receiving portion provided in the other member of the aforesaid two members, so as to receive in the inner sleeve a pivot extending from one of the aforesaid two members. A flange extends from one end of the outer sleeve radially outward of the sleeve along the opening edge of the bushing receiving portion, and the flange is held between the opening edge portion and a holder member removably joined to a support member provided in the bushing receiving portion.

9 Claims, 3 Drawing Figures

DEVICE FOR PREVENTING TUBULAR BUSHING ASSEMBLY FROM SLIPPING OUT

BACKGROUND OF THE INVENTION

1. Field of the Invention

This invention relates to a device for holding a tubular bushing assembly in place, and more particularly to a device for preventing a tubular bushing assembly from slipping out of a given position, when the tubular bushing assembly is incorporated, as a vibration isolator, in each pivot coupling portion in a vehicle body.

2. Description of the Prior Art

Some of the known tubular bushing assemblies of the type is incorporated into a pivot coupling portion between a suspension member of a trailing-arm-type wheel suspension system and a vehicle body. This type tubular bushing assembly includes an inner sleeve for receiving therein a pivot extending downward from the vehicle body, a tubular resilient member for receiving therein the inner sleeve and attached thereto, and an outer sleeve for receiving therein the resilient member and attached thereto. Each bushing assembly is fitted under pressure into respective bushing attaching portion provided in the suspension member, with the outer sleeve fitted into a hole provided in each bushing attaching portion, so that the bushing assembly is held in place in the bushing attaching portion by the frictional force of the outer sleeve relative to the bushing receiving portion.

Accordingly, should an external force stronger than the frictional force act on the outer sleeve in the axial direction thereof, the bushing assembly would slip out of the bushing attaching portion. With a view to preventing such a bushing assembly from slipping out of the bushing attaching portion, an attempt has been proposed, in which a diametrically outwardly projecting projection is formed on the outer sleeve and a recess engageable with the projection is provided in the inner peripheral wall of the hole in the bushing attaching portion, so that the bushing assembly can be retained in place by the so-called sliding fit of the projection into the recess in the wall of the hole. The sliding fit, however, can not completely prevent the slipping out of the bushing assembly. In order to fit under pressure the bushing assembly into the bushing attaching portion, a large force is needed. The bushing attaching portion must have a strength large enough to resist such a large force.

Another tubular bushing assembly of the known tubular bushing assemblies has been such that the outer sleeve of the bushing assembly consists of a pair of arcuate members, in order to permit compression in the diametrical direction of the resilient member. This type tubular bushing assembly is fitted under pressure into the hole in the bushing attaching portion, with the resilient member diametrically compressed between and within the pair of arcuate members. The frictional force of the outer sleeve, namely, respective arcuate members, relative to the bushing attaching portion is dependent on the resilient repulsion force of the resilient member. Accordingly, the tubular bushing assembly having an outer sleeve consisting of the pair of arcuate members is liable to slip out of the bushing attaching portion.

SUMMARY OF THE INVENTION

It is accordingly an object of the present invention to provide a device for preventing a tubular bushing assembly from slipping out of a bushing attaching portion, which is capable of retaining the tubular bushing assembly in place in a bushing attaching portion, independent of the frictional force of an outer sleeve of the bushing assembly relative to the bushing attaching portion.

To attain the object, there is provided according to the present invention a device for preventing a tubular bushing assembly from slipping out of a bushing attaching portion, wherein the tubular bushing assembly is incorporated into a pivot coupling portion between two members; and includes; an inner sleeve for receiving therein a pivot extending from one of the aforesaid two members; a tubular resilient member receiving therein the inner sleeve and attached thereto; and an outer sleeve receiving therein the resilient member and attached thereto; the tubular bushing assembly being fitted under pressure into a hole in each bushing attaching portion provided in the other member of the aforesaid two members; the aforesaid device for preventing the tubular bushing assembly from slipping out of the bushing attaching portion being characterized by; a flange portion extending from one end of the outer sleeve radially outward thereof along the circumferential edge of the hole in the bushing attaching portion; a support portion provided in the bushing attaching portion; a holder member for holding the flange portion in cooperation with the circumferential edge of the hole; and a means for joining the holder member to the support portion removably; the aforesaid flange portion of the outer sleeve being held by the opening edge and the holder member, so that the tubular bushing assembly may be firmly retained in place in the hole provided in the bushing attaching portion.

The above object and other features of the present invention will be more apparent from the ensuing part of the specification in conjunction with the drawings which indicate a preferred embodiment of the invention.

DESCRIPTION OF THE PREFERRED EMBODIMENTS

Figure 1:
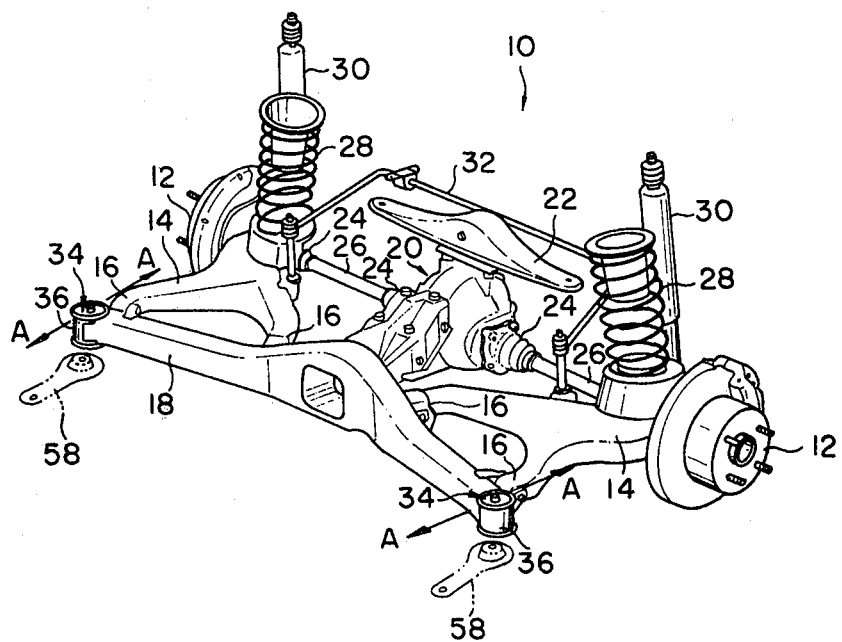
FIG. 1 is a perspective view of a wheel suspension system relating to the present invention.

Referring to FIG. 1, a vehicle suspension system is generally shown at reference numeral 10.

In the example shown, the suspension system 10 is of a semi-trailing type. A pair of trailing arm 14 for rotatably supporting axles 12 of wheels, as is well known are secured at a pair of front pivot portions 16 thereof pivotally movably in the vertical direction of the vehicle body to a rear suspension member 18 extending transversely of the vehicle body (shown generally at reference numeral 42 in FIG. 2).

A differential gear unit 20 which receives a drive force from a propeller shaft (not shown) is attached to the central portion of the suspension member 18, and coupled through the medium of a support member 22 to the vehicle body, which support member is positioned above the unit and catches a torque reaction force of the unit. Drive shafts 26 extend from the opposite sides of the differential gear unit 20, so as to transmit a drive force via universal joints 24 to the axles 12, respectively.

Provided between respective arms 14 and the vehicle body are suspension springs 28 consisting of coil springs and shock absorbers 30 for attenuating vibration of the suspension springs, respectively, as is well known. Provided between respective trailing arms 14 is a known stabilizer bar 32 for controlling the independent pivotal movement of individual arm. By the existance of the stabilizer bar, the inclination of the vehicle body, when the vehicle is turned, is controlled.

The suspension member 18 for carrying the pair of rocker arms 14 vertically rockably is coupled at the opposite ends thereof to the vehicle body. In the coupling portions between the suspension member and the vehicle body are incorporated tubular bushing assemblies 34 according to the present invention, for the purposes of reduction of shock and isolation of vibration, respectively.

Figure 2:
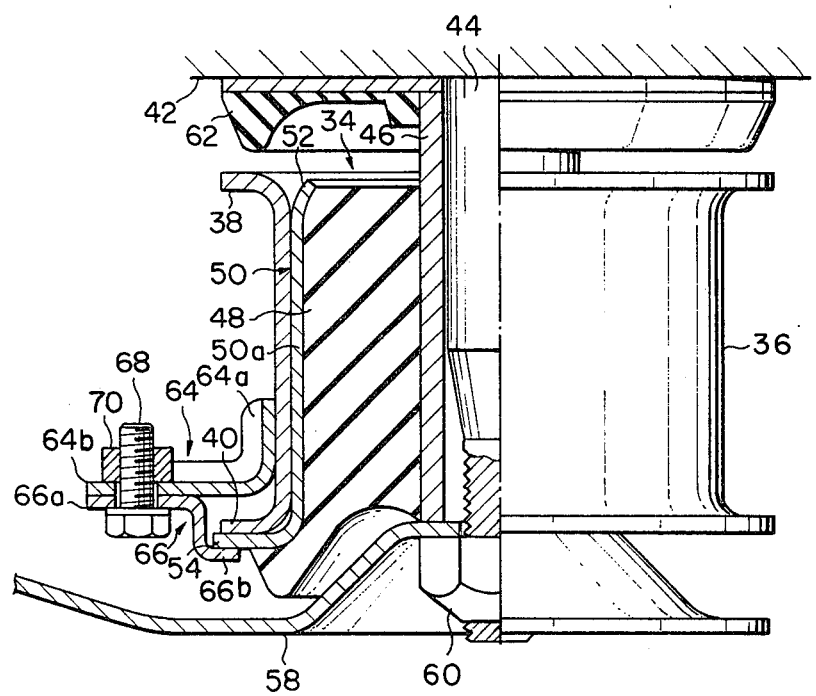
FIG. 2 is a side elevational view, partly broken, of a pivot coupling portion between a suspension member and a vehicle body, shown in FIG. 1; and, FIG. 3 is a transverse cross sectional view of a bushing assembly showing the condition of the assembly prior to being incorporated into the pivot coupling portion of FIG. 2.

Bushing receiving sleeves 36 for defining holes for receiving the tubular bushing assemblies 34 are attached to the opposite ends of the suspension member 18, as seen in FIGS. 1 and 2, respectively. Respective bushing receiving sleeve 36 has a circular cross section and annular flanges 38 and 40 radially outwardly extending from the upper and lower open ends, respectively.

Each bushing assembly 34 fitted into respective bushing receiving sleeve 36, as best seen in FIG. 2, includes an inner sleeve 46 for receiving a pivot 44 consisting of a bolt which is attached to the under side of the vehicle body 42 and extends downward therefrom; a resilient tubular member 48 surrounding the inner sleeve and adhered thereto; and an outer sleeve 50 receiving therein the resilient member and adhered thereto. The outer sleeve 50 has a reduced portion 52 at one end thereof and a radially outwardly extending flange 54 at the other end thereof.

Figure 3:
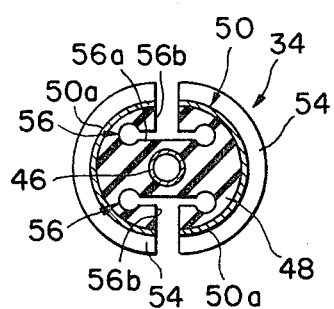

The resilient member 48 has substantially an oval cross section, and a pair of split grooves 56 which run in the axial direction of the resilient member in a mirror-image relation to each other with respect to the major diameter of the member 48, as shown in FIG. 3 showing the cross section of the bushing assembly. Each grooves 54 runs from one end of the member 48 to the other end thereof. Respective split groove 56 consists of a narrow groove portion 56a running in the direction of the major diameter of the resilient member 48 and terminating at small circles, and a wide groove portion 56b running from the mid point of the narrow groove portion in the direction of the minor diameter and open to the outer peripheral surface of the resilient member, thus presenting a T-shaped cross section. As a result, the outer peripheral portion of the resilient member 48 and its vicinity are axially split into two parts.

The outer sleeve 50 is of a split type sleeve and consists of a pair of arcuate members 50a respectively having a semi-circular cross section and extending along the outer peripheral surface of the resilient member 48 split into two parts by the grooves 56. Each arcuate member 50a has the reduced portion 52 at one end thereof and the flange portion 54 at the other end thereof, as described above. The pair of arcuate members 50a are disposed in an opposed relation to each other, with the opposing inner walls thereof aligned with the outer walls of the resilient member, which define the large groove 56b, and with the inner peripheral walls thereof adhered to the outer peripheral walls of the resilient member 48, respectively.

The bushing assembly 34 is fitted under pressure from the reduced portion 52 thereof into the bushing receiving sleeve 36, in a manner that the resilient member 48 is compressed in the direction of the major diameter thereof between the pair of arcuate members 50a, and hence, the opposing inner surfaces of the large groove portions 56b are brought nearer to each other. In this connection, the inner sleeve 46 receives therein the pivot 44.

When the bushing assembly is fitted under pressure into the receiving sleeve 36, the upper surface of the flange 54 of the outer sleeve 50 engages the under side of the lower flange 40 of the bushing receiving sleeve 36, and the resilient member 48 is held in place with the minor diameter thereof being in alignment with a line A—A of FIG. 1 which shows a front and rear direction of the vehicle body, without a risk of being compressed in the direction of the minor diameter. Therefore, the pair of narrow grooves 56a running transversely of the vehicle body, as viewed in the cross section of the resilient member, 48 are maintained intact, thus providing cavities in the resilient member 48. The cavities, as is well known, function to give a spring constant of the bushing assembly a directionality conforming to the diametrical direction of the bushing assembly. The spring constant with respect to the external force acting in the front and rear direction of the vehicle body between the inner and outer sleeves 46 and 50 of the bushing assembly 34 is determined to be smaller than that for the external force acting in the direction of width of the vehicle body. The split outer sleeves 50, namely, the pair of arcuate members 50a of the assembly, are fitted under pressure into the bushing receiving sleeve 36, i.e. the bushing attaching portion, due to the resilient repulsion force accruing from forcible insertion of the resilient member 48 thereinto.

The lower end of the pivot 44 projects from the inner sleeve 46, as clearly shown in FIG. 2, and a lower stopper 58 consisting of a plate member is fitted on the lower end of the pivot engageably with the lower end face of the resilient member 48 at a spacing therefrom. A nut 60 is screwed on the lower end of the pivot. The inner sleeve 46 of the bushing assembly 34 is secured to the vehicle body 42 by tightening the nut 60. The lower stopper 58 extends to the front of the vehicle body 42 as best seen in FIG. 1, and is attached thereto. The lower stopper 58 is adapted to engage the lower end face of the resilient member 48, thereby preventing an excessive shearing deformation of the resilient member between the inner and outer sleeves 46 and 50 of the assembly, as well as functioning to support the pivot 44 at the lower end thereof. An annular resilient upper stopper 62 is attached to the lower surface of the vehicle body 42, which opposes the upper flange 38 of the bushing receiving sleeve 36, engageably with the upper flange 38 at a spacing therefrom.

In order to prevent undesirable axial slide of the split outer sleeves 50 relative to the bushing receiving sleeve 36, an L-shaped member 64 constituting a support portion, and a holder member 66 associated with the L-shaped member are provided in the bushing receiving sleeve 36.

The L-shaped member 64 is attached at the vertical portion 64a thereof to the outer peripheral wall of the bushing receiving sleeve 36 in the vicinity of the lower flange portion 40 thereof. The other portion 64b of the L-shaped member 64 horizontally extends radially outward of the bushing receiving sleeve 36. A female threaded member, namely, a nut 70, for defining a female threaded hole for a bolt 68 being a male threaded member is attached to the horizontal portion 64b of the L-shaped member 64.

The holder member 66 is a crank-shaped member, in one horizontal portion 66a of which is provided a through-hole for receiving the bolt 68. The horizontal portion 66a of the crank-shaped member 66 is removably secured, by the coupling means consisting of the bolt 68 and the nut 70 screwed on the bolt, to the horizontal portion 64b of the L-shaped member 64. The other horizontal portion 66b of the crank-shaped member 66 extends radially inward of the outer sleeve 50 of the bushing assembly along the lower end face of the lower flange 54 of the outer sleeve 50, so as to receive thereon the lower flange 54 thereof.

In assembly, the holder member 66 is connected to the L-shaped support member 64 by the coupling means 68 and 70, after respective bushing assembly 34 has been forcibly fitted into each bushing receiving sleeve 36, whereby the flange portions 54 of the pair of arcuate members 50a of the outer sleeve 50 are held between the lower flange 40 of the bushing receiving sleeve 36 and the other horizontal portion 66b of the holder member 66, with the freedom of the slide in the circumferential direction as well as the slide in the axial direction of the outer sleeve 50 relative to the assembly receiving sleeve 36. The outer sleeve 50 therefore no longer slips out of the assembly receiving sleeve 36 even by the strong external force acting in the axial direction of and between the outer sleeve 50 and the assembly receiving sleeve 36, and hence the lowering of vibration isolating and shock decreasing functions which would be incurred by dislocation of the outer sleeve is no longer experienced.

Furthermore, retention of the outer sleeve 50 in place in the assembly receiving sleeve 36 is achieved, without a need of being dependent on the resilient repulsion force of the resilient member 48. The resilient member 48 may therefore be formed of a softer material than a resilient member in the conventional assembly is. Thus, the improved vibration isolating property of the bushing assembly results.

In the embodiment so far described, the lower flange 40 is provided at the lower opening edge of the assembly receiving sleeve 36, and the flange portion 54 of the outer sleeve 50 is held between the lower flange and the end portion 66b of the support member 66. As an alternative, the lower flange 40 may be omitted, and in turn, the flange portion 54 of the outer sleeve 50 be held between the lower opening edge of the assembly receiving sleeve 36 and the end portion 66b of the support member 66.

Although the above description has been made for the tubular bushing assembly including the outer sleeve 50 consisting of the pair of arcuate members and the resilient member 48 having a pair of split grooves 56, the present invention may be applied to the tubular bushing assembly having a solid outer sleeve and a resilient member having no split groove.

Furthermore, the present invention may be availed for a tubular bushing assembly to be incorporated into a variety of pivot coupling portions, other than the tubular bushing assembly incorporated into the pivot coupling portions between the suspension member of the wheel suspension system and the vehicle body, described above.

According to the present invention, the flange portion of the outer sleeve of the bushing assembly can be held between the opening edge of the bushing receiving portion and the support member joined to the bushing receiving portion, so that the outer sleeve of the bushing assembly may be held in place in the bushing receiving sleeve, without being slipped out of the bushing receiving sleeve, with the assurance of the vibration isolating and shock reducing functions by the respective bushing assembly.

What is claimed is:

1. In a device for preventing a tubular bushing assembly being used as a vibration isolator from slipping out of a hole provided in a bushing attaching portion, wherein a pair of said tubular bushing assemblies are fitted into a pair of pivot coupling between a vehicle body and a suspension member in a suspension system for a vehicle and each tubular bushing assembly includes an inner sleeve for receiving therein a pivot extending from said vehicle body, a tubular resilient member receiving therein said inner sleeve and attached thereto, and an outer sleeve receiving therein said resilient member and attached thereto, said tubular bushing assembly being fitted into the hole provided in the bushing attaching portion, the improvements comprising:
   a flange portion provided at one end of said outer sleeve and extending radially outward of said hole provided in said bushing attaching portion along the opening edge of said hole,
   a support portion provided in said bushing attaching portion, said support portion extending radially outward of said bushing attaching portion over one end thereof;
   a holder member joined to said support portion at one end thereof and the other end thereof extending inwardly of said outer sleeve along the bottom surface of said flange portion so as to hold said flange portion between the circumferential edge of said hole and the other end of the holder member; and
   a means for connecting said holder member to said support portion removably.

2. A device for preventing a tubular bushing assembly from slipping out, as defined in claim 1, wherein said resilient member has a pair of split grooves running in a direction of diameter of said resilient member and open to the outer peripheral wall thereof; and said outer sleeve is a split outer sleeve consisting of a pair of arcuate members positioned in an opposed relation to each other with a spacing left therebetween, said spacing corresponding to the width of said split groove.

3. A device for preventing a tubular bushing assembly from slipping out, as defined in claim 1, wherein one of said two members is a vehicle body, and the other of said two members is a suspension member, by which a pair of trailing arms for carrying the axles of wheels are vertically rockably carried.

4. A device for preventing a tubular bushing assembly from slipping out, as defined in claim 1, wherein said bushing attaching portion is formed of a bushing receiving sleeve attached to said other member, said bushing receiving sleeve having a diametrically outwardly extending flange at least one end thereof; said flange of said bushing receiving sleeve constituting the opening edge of said hole.

5. A device for preventing a tubular bushing assembly from slipping out, as defined in claim 1, wherein said holder member is a crank-shaped member which is joined at one end thereof to the bottom surface of said support portion, and the other end thereof extending radially inwardly of said outer sleeve along the bottom surface of the flange portion of said outer sleeve, so as to receive thereon said flange portion of said outer sleeve.

6. A device for preventing a tubular bushing assembly from slipping out, as defined in claim 1, wherein said connecting means consists of a female threaded member provided in said support portion, and a male threaded member screwed in said female threaded member.

7. In a device for preventing a tubular bushing assembly from slipping out of a bushing attaching portion, wherein said tubular bushing assembly includes, an inner sleeve for receiving therein a pivot extending downward from the under side of a vehicle body, a resilient tubular member receiving therein said inner sleeve and attached thereto, said resilient tubular member having a pair of split grooves running axially of said tubular resilient member to open to the outer peripheral surface thereof, and split outer sleeve consisting of a pair of arcuate members covering the outer peripheral surface of said resilient member and adhered thereto, with the inner walls thereof positioned in an opposing relation to each other with a spacing left therebetween in conformity with said split grooves, said tubular bushing assembly being fitted under pressure into respective bushing receiving sleeve attached to each end of a suspension member and having at one end thereof a flange extending radially outward thereof, said suspension member carrying a pair of trailing arms vertically rockably, the improvements comprising:

flanges extending from one end of respective arcuate members radially outward of said resilient member and adapted to engage said flange portion of said bushing receiving sleeve;

a support member attached to the outer periphral wall of said bushing receiving sleeve;

a holder member for holding the flanges of said pair of arcuate members in cooperation with said flange of said bushing receiving sleeve; and a connecting means for joining said holder member to said support member removably.

8. A device for preventing a tubular bushing assembly from slipping out, as defined in claim 7, wherein said holder member is a crank-shaped member which is joined at one end thereof to the bottom surface of said support member, and the other end thereof extending radially inwardly of said outer sleeve along the bottom surface of the flange of said arcuate member, so as to receive thereon said flange of said arcuate member.

9. A device for preventing a tubular bushing assembly from slipping out, as defined in claim 8, wherein said support member is an L-shaped member having a vertical portion attached to the outer wall of said bushing receiving sleeve and a horizontal portion extending outward of said bushing receiving sleeve, said holder member being joined to said horizontal portion.

* * * * *